P. F. DUNDON.
AIR HEATING STRUCTURE.
APPLICATION FILED JULY 29, 1918.

1,334,741.

Patented Mar. 23, 1920.
2 SHEETS—SHEET 1.

Inventor.
Patrick F. Dundon
By Strong & Townsend
Attys

P. F. DUNDON.
AIR HEATING STRUCTURE.
APPLICATION FILED JULY 29, 1918.
1,334,741.
Patented Mar. 23, 1920.
2 SHEETS—SHEET 2.
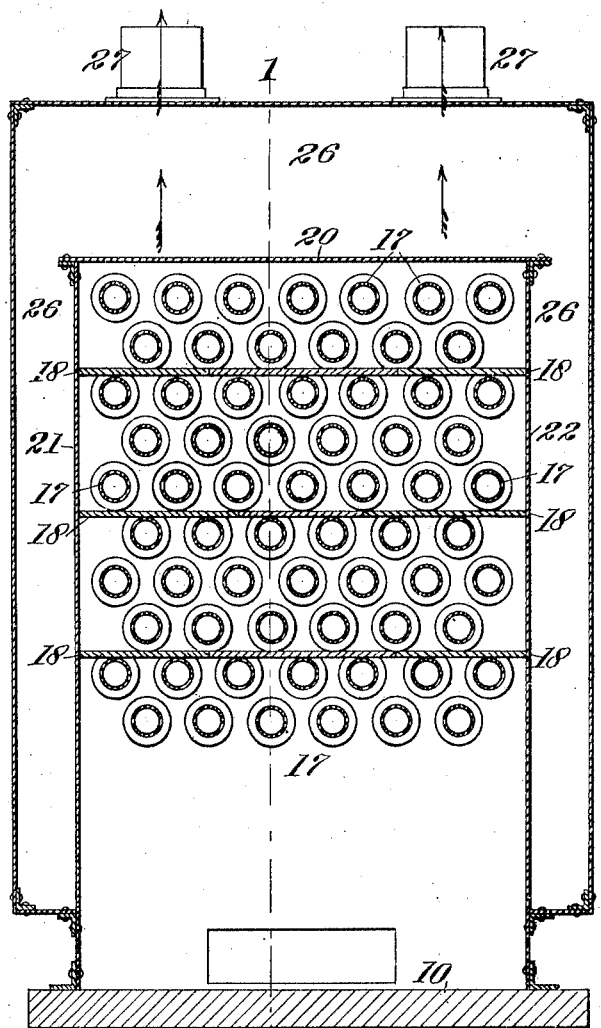
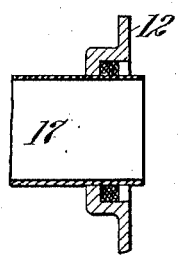
Inventor,
Patrick F. Dundon.
By Strong & Townsend
attys

UNITED STATES PATENT OFFICE.

PATRICK F. DUNDON, OF SAN FRANCISCO, CALIFORNIA.

AIR-HEATING STRUCTURE.

1,334,741.  Specification of Letters Patent.  Patented Mar. 23, 1920.

Application filed July 29, 1918. Serial No. 247,107.

*To all whom it may concern:*

Be it known that I, PATRICK F. DUNDON, a citizen of the United States, residing at San Francisco, in the county of San Francisco and State of California, have invented new and useful Improvements in Air-Heating Structures, of which the following is a specification.

This invention relates to an air heating device and particularly pertains to a furnace structure.

It is the principal object of this invention to provide a furnace structure of simple design adapted to heat air passing therethrough to a predetermined temperature, or to circulate cool air for ventilating purposes, the temperature of the air being controllable during the performance of the furnace, the air being heated in small units to insure maximum heat absorption.

The present invention contemplates the use of a furnace body constructed with a plurality of relatively small air passageways through which air may flow by natural or forced draft and along which heat will be absorbed from a heat medium.

The invention is illustrated by way of example in the accompanying drawings in which:

Fig. 2 is a view in transverse vertical section as seen on the line 2—2 of Fig. 1.

Fig. 3 is a fragmentary view in section of the end of an air circulating tube.

Figure 1:
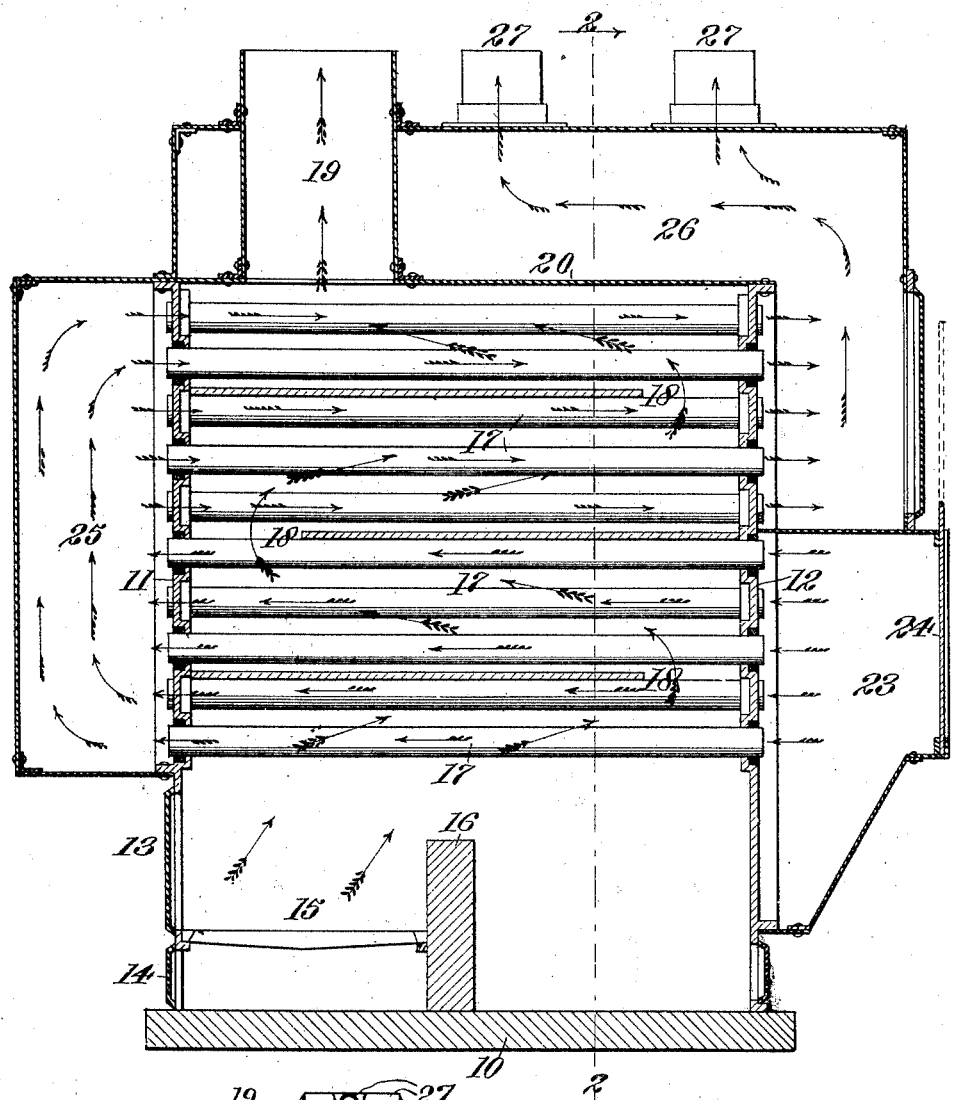
Figure 1 is a view in vertical section and elevation illustrating the furnace.

Referring more particularly to the drawings, 10 indicates a suitable floor upon which is disposed upright end walls 11 and 12. These walls form the opposite ends of a furnace compartment. The walls are formed of non-combustible material and the forward one has openings providing a furnace door 13 and a lower draft door 14. A fire box is formed between this wall and a fire wall 16.

Above the heat compartment thus formed are a plurality of air circulating tubes 17. These tubes may be cylindrical in formation and are open at their opposite ends. In Fig. 3 it will be seen that the tubes project through openings in the end walls 11 and 12 of furnace. The walls are recessed around these openings to form packing space into which a non-combustible material such as asbestos is forced. This will insure that the fresh air circulating through the furnace will not be contaminated by the gases passing from the fire box of the furnace. The tubes as shown in Fig. 2 lie parallel to each other and in horizontal alinement. They are also staggered in the separate rows to be more uniformly affected by the heat of the furnace.

A series of baffle walls 18 are positioned between certain sets of the tubes and disposed horizontally. These walls are alternately secured to the opposite end members 11 and 12. Due to this arrangement the gases and hot air will follow a sinuous course of travel as they pass to the smoke exhaust pipe 19.

Figure 4:
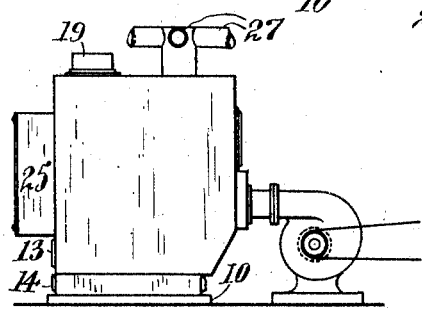
Fig. 4 is a view illustrating another form of the invention.

The compartment inclosing the tubes 17 is formed by the end walls 11 and 12, a horizontal wall 20 and vertical side walls 21 and 22. These walls form the central portion of the furnace. They are inclosed by outer walls forming an air circulating jacket, which insures a maximum absorption of the radiant heat by the fresh air passing therethrough. The jacket consists of an inlet compartment 23 having a slidable door 24, an intermediate compartment 25 and a side and top compartment 26. The inlet compartment 23 conducts fresh air to the lowermost of the circulating tubes 17. This air passes through these tubes and into the compartment 25 at the opposite or forward end of the furnace. The air will travel upwardly and thereafter pass into the remaining sets of tubes. The outlet ends of these tubes communicate with the compartment 26 from which the heated air will travel through distributing pipes 27 to the various points of exit. These pipes may also be formed as shown in Fig. 4. In some instances it may be necessary to supply the fresh air to the compartment 23 by forced draft. The compartment 26 has its top or horizontal portion overlying wall 20 of the furnace and secured to the latter at its front as shown in Fig. 1, while its rear end depends vertically and is supported by the top of the compartment 23, the latter thus forming a bottom for the rear end. The top wall 20 of the furnace is further extended at its front end and forms the top of compartment 25.

The structure may be utilized for producing heat for human comfort and also to develop heat for cooking purposes, the evaporation of fruit, in connection with drying kilns and for other kindred purposes. By the addition of other furnaces the air may be superheated. For ventilating purposes the use of the fire box may be discontinued and air forced through the structure by impelling means. It will also be evident that when used for ventilation the fresh air may be cooled by refrigerating means if desired.

In operation heat is generated in the fire box, and will then pass upwardly and around and over the baffle plates 18. During this movement the flame and heated gas will impinge directly against the outer surfaces of the circulating pipes 17 and will impart the heat to the air passing therethrough. The path of travel of the air and gas from the fire box is indicated by full arrows, while the circulatory course of the fresh air is indicated by half arrows. Further absorption of heat will take place in the jacket compartments as the air passes to the outlet pipes.

Having thus described my invention, what I claim and desire to secure by Letters Patent is—

In an air heating structure, a furnace having a fire door and having air tubes opening through opposite walls thereof, said walls having upper and lower flanges, a top wall seated upon the upper flanges and extending at one end beyond one of said walls, a box-like compartment supported and having its top formed by said extending end of the top furnace wall and depending therefrom and into which the tubes at one end open, the bottom of said compartment being disposed above the furnace door, an inlet compartment into which the opposite ends of the lower tubes open, an upper compartment having a horizontal portion flanged and secured at one end to said top wall of the furnace and to the upper flange of the wall having the fire door and having a vertical depending portion seated on the top of the inlet compartment and supported thereby, the top of the inlet compartment forming the bottom of the vertical depending part, said inlet compartment having an end extending outwardly beyond the outer face of the vertical depending part of the upper compartment, and a vertical sliding door for said end of the inlet compartment operating over the outer face of said depending part of the upper compartment, the bottom of the box-like compartment being secured to the lower flange of the wall having the fire door and the bottom of the inlet compartment being secured to the other lower flange.

In testimony whereof I have hereunto set my hand.

PATRICK F. DUNDON.